US006576907B1

(12) United States Patent
Klein et al.

(10) Patent No.: US 6,576,907 B1
(45) Date of Patent: Jun. 10, 2003

(54) HIGH COUNT RATE GAMMA CAMERA SYSTEM

(75) Inventors: Ytzhak Klein, Kiryat Yam; Alexander Fishler, Haifa, both of (IL)

(73) Assignee: Elgems Ltd., Tirat Hacarmel (IL)

( * ) Notice: Subject to any disclaimer, the term of this patent is extended or adjusted under 35 U.S.C. 154(b) by 411 days.

(21) Appl. No.: 09/585,371

(22) Filed: Jun. 1, 2000

(51) Int. Cl.$^{7}$ .................................................. G01T 1/20
(52) U.S. Cl. .............. 250/369; 250/363.04; 250/363.07
(58) Field of Search ............................ 250/369, 363.04, 250/363.07

(56) References Cited

U.S. PATENT DOCUMENTS

| | | | | |
|---|---|---|---|---|
| 4,100,413 A | | 7/1978 | Inbar et al. | 250/366 |
| 4,455,616 A | * | 6/1984 | Inbar | 250/363 |
| 4,580,055 A | | 4/1986 | Barfod | 250/366 |
| 5,508,524 A | * | 4/1996 | Goldberg et al. | 250/369 |
| 5,585,637 A | * | 12/1996 | Bertelsen et al. | 250/369 |
| 5,586,637 A | | 12/1996 | Aidlin et al. | 198/367.1 |
| 6,160,259 A | * | 12/2000 | Petrillo et al. | 250/363.07 |
| 6,310,349 B1 | * | 10/2001 | Wong et al. | 250/363.09 |

FOREIGN PATENT DOCUMENTS

| | | |
|---|---|---|
| EP | 0 706 065 | 4/1996 |
| WO | WO 98/50802 | 11/1998 |

OTHER PUBLICATIONS

Yamashitatakashi; Patent Abstract of Japan; vol. 017, No. 626 (P–1647;) Nov. 18, 1993 & JP–05–203754; Aug. 10, 1993.

Tanaka Mitsuhiro; Patent Abstract of Japan; vol. 008, No. 163 (p–290;) Jul. 27, 1984 & JP 59–060380; Apr. 6, 1984.

Muehllehner, G. et al.; "Performance Parameters of a Positron Imaging Camera;" Feb. 1976; IEEE Transactionson Nuclear Science; vol. NS–23, No. 1; pp. 528–537.

Paans, A. M. J. et al.; "Performance Parameters of a Longitudinal Tomographic Positron Imaging Systems;" Feb. 1982; Nuclear Instruments and Methods; vol. 192; pp. 491–500.

* cited by examiner

*Primary Examiner*—Georgia Epps
*Assistant Examiner*—M. Hasan
(74) *Attorney, Agent, or Firm*—Fenster & Company

(57) ABSTRACT

A gamma camera system that increases the count rate by counting events that time-wise appear to be pile-up events but are spatially separated.

52 Claims, 4 Drawing Sheets

CAMERA HEAD #1
32
31
33
DELAY
59
SWITCH ARRAY
53
SWITCH ARRAY ENABLE MUX
37
3
47
40
FAST EVENT DETECTOR
34
FAST LOCATION COMPUTER
36
x,y,z
48
FAST ADC
49
51
MAP GENERATOR & SWITCH CONTROL LOGIC
52
50
PULSE SHAPER
58A
58B
58C
Σ
54A
54B
54C
PUR A
PUR B
PUR C
56A
56B
56C
LOGIC
57
60
COORDINATE COMPUTATION CIRCUITRY
42
MEMORY
61
43
62
45
38
TO COINCIDENCE CIRCUIT

HIGH COUNT RATE GAMMA CAMERA SYSTEM

FIELD OF THE INVENTION

This invention relates to radiation-imaging apparatus employing "gamma cameras" having coordinate computation circuitry and energy summation circuits for computing the location and the energy of "events" in such systems, and in particular to high count rate gamma camera systems. This computed information is used to provide images based on the energy and location of the events.

BACKGROUND OF THE INVENTION

Since the invention of the gamma camera by Anger, scientists have been attempting to improve the count rate of the camera and the camera's resolution at the higher count rates when used in single photon emission (SPE) imaging systems. Anger gamma camera type systems are now also used in high count positron emission tomographic (PET) systems, using multi-head gamma cameras and coincidence circuits.

The count rate of the camera, that is the number of impingements that can be recorded by the camera per unit time, is a function of the dead time of the camera. The dead time of the camera is a time during which the system processes a single event and is not available to process a succeeding event. The term "event" as used herein means the impingement of a scintillator by radiation stimuli that surpasses a given threshold and cause a scintillation and a consequent electrical signal from light sensors, such as photo-multiplier tubes (PMTs), coupled to the scintillator. Related to the dead time, but separately defined therefrom is "pulse pile-up". A pulse pile-up is a second scintillation that occurs within the light collection time of a first scintillation. In the case of pulse pile-up, the computation system treats the two pulses as one; and thereby computes the energy and location of both scintillations together, which results in an erroneous location and energy. In yet the erroneous computation understandably degrades the image and thus the rejection of pulse pile-up events significantly improves the image. However, the blanket rejection of pulse pile-up events by prior art systems lowers the count rate.

Anger type gamma cameras have been used in single photon emission computerized tomographic systems (SPECT) and planar systems for many years. More recently, Anger cameras have been used in PET systems. In both cases, the introduction of relatively high-speed detection electronics and computer systems for image acquisition and processing has made it even more desirable that the count rate of the Anger type camera be increased. In PET systems, the detection of two gamma rays in different gamma camera heads in coincidence is used to enable computation of imaging information. See, for example, a paper presented by G. Muehllehner et al, entitled "Performance Parameters of a Positron Imaging Camera", published in the I.E.E.E. Transactions on Nuclear Science, volume NS-23, No. 1, pp 528–537 (February 1976). See also a paper entitled "Performance Parameters of the Longitudinal Tomographic Positron Imaging System" by A. M. J. Paans et al, in Nuclear Instruments & Methods, vol. 192, pp 491–500 (February 1982).

Higher count rates of usable output signals are achieved by decreasing dead time. Rejecting pile-up events improves the image but lowers the count rate. Among the systems used in the past for increasing the count rate have been the use of means for reducing the dead time of the cameras. More particularly, in the past, among the ways for reducing the dead time has been truncation of the pulse provided by the PMTs of the scintillation camera. See, for example, U.S. Pat. No. 4,455,616, the contents of which are hereby incorporated by reference.

Also, in the past, gamma camera images have been improved by, among other things, determining the region in the crystal within which a light event occurs, and coupling to the coordinate computing circuitry only photo-detectors immediately adjacent to the light event. Thus, in the past, it has been known to connect PMTs that are immediately adjacent to the light event to coordinate computation circuitry. See, for example, U.S. Pat. No. 4,100,413, the contents of which are hereby included herein by reference.

Another prior art method for allegedly increasing count rate has been utilization of more than one integrator for each scintillation detector channel enabling the system to collect more than one event per detector at a time in either PET or SPECT mode. (See, for example, U.S. Pat. No. 5,586,637). One of the problems with the system of that patent is that no pile-up rejection is used. The patent contends that no pile-up rejection is required. The multiple integrators, however, do not solve pile-up problems that occur within selected clusters. The pile-up events that are not rejected are contaminated, and their use adversely affects the image. The decision of prior art systems is to discard the pile-up events without taking into account the spatial distance between the events causing the pile-up. This discarding of pile-up events significantly decreases the count rate of the cameras.

SUMMARY OF THE INVENTION

It is an aspect of some embodiments of the present invention to take into account both the spatial and time separation between events that are presently considered pile-up events. Preferably, this enables utilization of previously discarded events.

In some embodiments of the invention, multiple events that occur within the dead time of the event detector ($\tau_1$) ns are considered contaminated and are rejected. In some embodiments, events that are monitored by different clusters of PMTs and occur after $\tau_1$ ns are used. Also, events monitored by the same cluster and separated by at least the integration time of the detector ($\tau_2$ns ns) are used.

According to alternate embodiments of the invention, events that are spatially separated can be used even if they are almost simultaneous.

According to an aspect of some embodiments of the present invention, a system of dynamic cluster selection is used. More particularly, a quick-Anger computation is performed in order to quickly obtain coarse X-Y coordinates. The X-Y coordinates may be normalized with the energy that is also quickly obtained and used to select a cluster of PMTs adjacent to the event for processing the signals initiated by the event. In some embodiments, the selection of the cluster is accomplished using a look-up table (LUT), wherein the address is the location defined by the coarse X-Y coordinates and the output selects the PMTs of the cluster. In some embodiments, the PMTs immediately adjacent to the light event location are directly selected by switching circuitry. The cluster will contain PMTs that are proximate to the event and the outputs of which will be used in the Anger computations. To accomplish this, one or more array of analog switches may be activated so that only the light sensors such as PMTs contained in the selected cluster are connected to the regular coordinate computation circuitry. One of the advantages of the dynamic cluster selection is the resultant improvement in homogeneity of the image. Optionally, the connection to the regular coordinate computation circuitry includes a pile-up rejector associated with the region monitored by the cluster.

In some embodiments, all multiple events occurring within a time frame of less than $\tau_1$ ns of each other are rejected. Multiple events, wherein one of the events is within the selected region and one of the events occurs outside of the scope of the selected cluster of PMTs are not considered pile-up events; even though the events occur within less than $\tau_2$ ns of each other, both events are used. The event outside the selected region does not interfere with the Anger computation of the current event within the selected region. In this way the system's dead-time is reduced significantly and the count rate is increased meaningfully; since, a plurality of different clusters are used to process the events within a given time frame and counts formerly rejected are now used. The detection and rejection of pile-up events, within the selected regions, is performed using event detectors and pile-up rejectors. In some embodiments, the PMT located over the peak signal is used as the center of the cluster, or optionally, to determine the position and shape of the cluster.

In accordance with an aspect of some embodiments of the present invention, a gamma camera system with improved count rate is provided. An exemplary system includes: a gamma camera detector including a scintillation crystal that scintillates responsive to impingement by radiation. A plurality of light sensors or scintillation detectors, such as PMTs, are provided for converting said scintillations to electrical signals. A coarse coordinate determining circuit operates responsive to the electrical signals to quickly determine the approximate coordinates of the events. A scintillation detector cluster selector is operated responsive to the determined coordinates of the events to select a cluster of PMTs to monitor the detected events; and a pile-up rejector is used for rejecting pile-up events i.e., that are spatially proximate to the determined coordinates and occur within a time frame less than $\tau_1$ (about 50 nanoseconds) of a preceding event.

Circuitry can be provided for processing events that would, in prior art systems, normally be pile-up events and not be processed, since time-wise the succeeding event occurs close to a preceding event. However, according to the invention, since the succeeding events are spatially removed from said determined coordinates of the preceding events and are thus outside of the limits monitored by the selected cluster of light sensors, the preceding events and the succeeding events both may be used. Even if only some of the events that prior art systems discarded are used, this represents a significant increase in the number of events used. The used "pile-up" events previously discarded (or which degraded the image if they were not discarded) provide higher count rate imaging data, which among other things, improves the camera's resolution, and consequently the image quality.

According to another aspect of some embodiments of the present invention, a gamma camera system with improved count rate is provided. Within the scope of the invention, the gamma camera system may include SPECT systems and PET systems, jointly or separately.

In an embodiment used in PET systems, a high count rate nuclear camera includes a pair of gamma camera heads for detecting radiation striking the scintillators of the heads. A quick coordinate-determining circuit is provided for each head for determining the coordinates of the point of impingement of the radiation on the radiation detection. A PMT cluster selector in each head operates responsive to said determined coordinates for selecting certain PMTs adjacent to the event location as determined by the coordinates. Coincident circuitry is provided for determining the coincidence of events occurring in each of the heads within a given time frame. Circuitry is provided for rejecting "pile-up" events that are proximate to the determined coordinates. Spatially separated multiple events previously rejected by prior art pile-up rejectors can be processed in their individual clusters.

There is thus provided, in accordance with an aspect of an embodiment of the invention, a gamma camera system including: a gamma radiation detector comprising light sensors operative to detect locations of events responsive to gamma radiation impinging on the detector; a light sensor selector that selects light sensors adjacent to the location of the events time; and wherein said system uses preceding and succeeding events when the succeeding events are outside the area monitored by the selected cluster. In an aspect of an embodiment of the invention, the gamma camera system includes analog to digital circuitry to wholly or partially digitize said system. Further, in the gamma camera system, the light sensors provide an aspect of the invention, the sensors are PMTs.

There is further provided a gamma camera system including: pile-up rejector (PUR) circuitry for rejecting as pile-up events, succeeding events which occur while preceding events are being processed when said succeeding events are within an area monitored by a selected cluster. Among other things, the gamma camera system uses preceding events and succeeding events when the succeeding events are in the scope of a different selected cluster and are separated sufficiently time-wise so that the events do not contaminate one another. According to an aspect of an embodiment of the inventor, the time-wise separation is approximately 50 ns. The gamma camera system further comprises location circuitry that processes said signals to determine coarse coordinates of the detected events. In an embodiment of an aspect of the invention, the location circuitry includes at least one fast event detector and at least one fast location computer for approximating the coordinates of said detected events. The location circuitry may further include coordinate computation circuitry for determining the location of the events for imaging purposes. In accordance with an aspect of an embodiment of the invention, the light sensor selector includes: a switch array Mux operated responsive to said fast event detector for selecting a plurality of switch arrays to select light sensors to form said selected cluster. The noted gamma camera system includes a delay circuit for delaying said signals from the light sensors to provide delayed signals. In some aspects of embodiments of the invention, the light sensor selector further includes a fast-location computer to compute the coarse location of the detected event and also switch control logic circuitry for selecting the switch arrays to connect the light sensors closest to the detected event for providing the selected cluster to monitor the event. In addition, according to some aspects of an embodiment of the invention, summation circuits are connected to said selected light sensors through said switch array to sum the signals in order to provide total energy signals; and coordinate computation circuitry 15 included for providing coordinates of the detected event responsive to said delayed signals. An aspect of an embodiment of the gamma camera system, includes shaping circuitry for shaping the delayed signals before the transmittal of the delayed signal to the coordinate computation circuitry; and logic circuitry for enabling the image coordinate computation circuitry. The logic circuit may include a threshold enable circuit for enabling the coordinate computation circuitry when the detected signal is greater than a certain threshold. In some aspects of an embodiment of the invention, the shaping circuitry includes integrating circuitry. The integrating circuitry may comprise a plurality of integrators for each PMT. A gamma camera system, according to an aspect of an embodiment of the invention, including at least a pair of gamma camera heads and coincidence circuitry for determining when there is a coincident event at each of said gamma camera heads. In some embodiments, at least one analog to digital converter for converting the detected analog signals to digital signals is provided.

There is thus provided a high count rate method for a gamma camera system including a gamma radiation detector comprising a scintillation crystal and a plurality of light detectors for converting scintillations to signals; the method including detecting events responsive to gamma radiation impinging on said detector; processing said detected events to approximate energy and coordinates of the detected events; monitoring the detected events from locations adjacent to the events; and accepting preceding and succeeding events, when the succeeding events occur within a dead time caused by the preceding event but are outside the area monitored from location adjacent to the events. The high count rate method of claim 24 includes providing signals responsive to said events. The signals may be analog signals or digital signals or analog signals may be converted to digital signals. The method may include accepting preceding events and succeeding events when the succeeding events are in the area different than the area adjacent to the event. In some aspects of an embodiment of the invention, the events are accepted when there is a time-wise separation between the succeeding and preceding events, such that the succeeding events are not contaminated by the preceding events. In some aspects of the embodiment of the invention, the time-wise separation is approximately greater than 50 ns. The high count rate method may include approximating the coordinates of said detected events. The high count rate method may also include determining the location of the events with greater accuracy. The high count rate method of an aspect of an embodiment of the invention includes delaying said signals and fine coordinates of the detected event may be computed responsive to said delayed signals. The delayed signals may be shaped before computing the fine coordinates of the detected event; and total energy signals may be used to normalize the fine coordinates. According to an aspect of an embodiment of the invention, accurate computation of the coordinates is enabled when the energy of the events is greater than a certain threshold. The high count rate method may include shaping said detected signals. The shaping may include integrating. An aspect of an embodiment of the invention includes converting the detected analog signals to digital signals. The method may include providing the number of coordinate computation circuits equal to the number of switch arrays. In a like manner, the high count rate method may include using a number of coordinate computation circuits approximating the number of light detectors. The method may also include using a number of pulse shapers approximating the number of light detectors. The method may also include limiting the number of pulse shapers to no more than the number of switch arrays.

In an aspect of an embodiment of the invention, a high count rate gamma camera method uses a gamma camera, and includes: determining the locations of preceding and succeeding events; the preceding and succeeding events that occur within a time interval proportional to the light collection time of the camera but are spatially separated are used. The high count rate method may include partially digitizing the gamma camera or wholly digitizing the gamma camera.

BRIEF DESCRIPTION OF THE DRAWINGS

The features of the invention which are believed to be novel are set forth with particularity in the appendant claims. Non-limiting aspects of embodiments of the present invention are described below with reference to the figures attached hereto. In the figures, identical structures, elements or parts that appear in more than one figure are generally labeled with the same numeral in all figures in which they appear. Dimensions of components and features shown in the figures are chosen for convenience and clarity of presentation and are not necessarily shown to scale. The figures are listed below.

DETAILED DESCRIPTION OF EMBODIMENTS

Figure 1A:
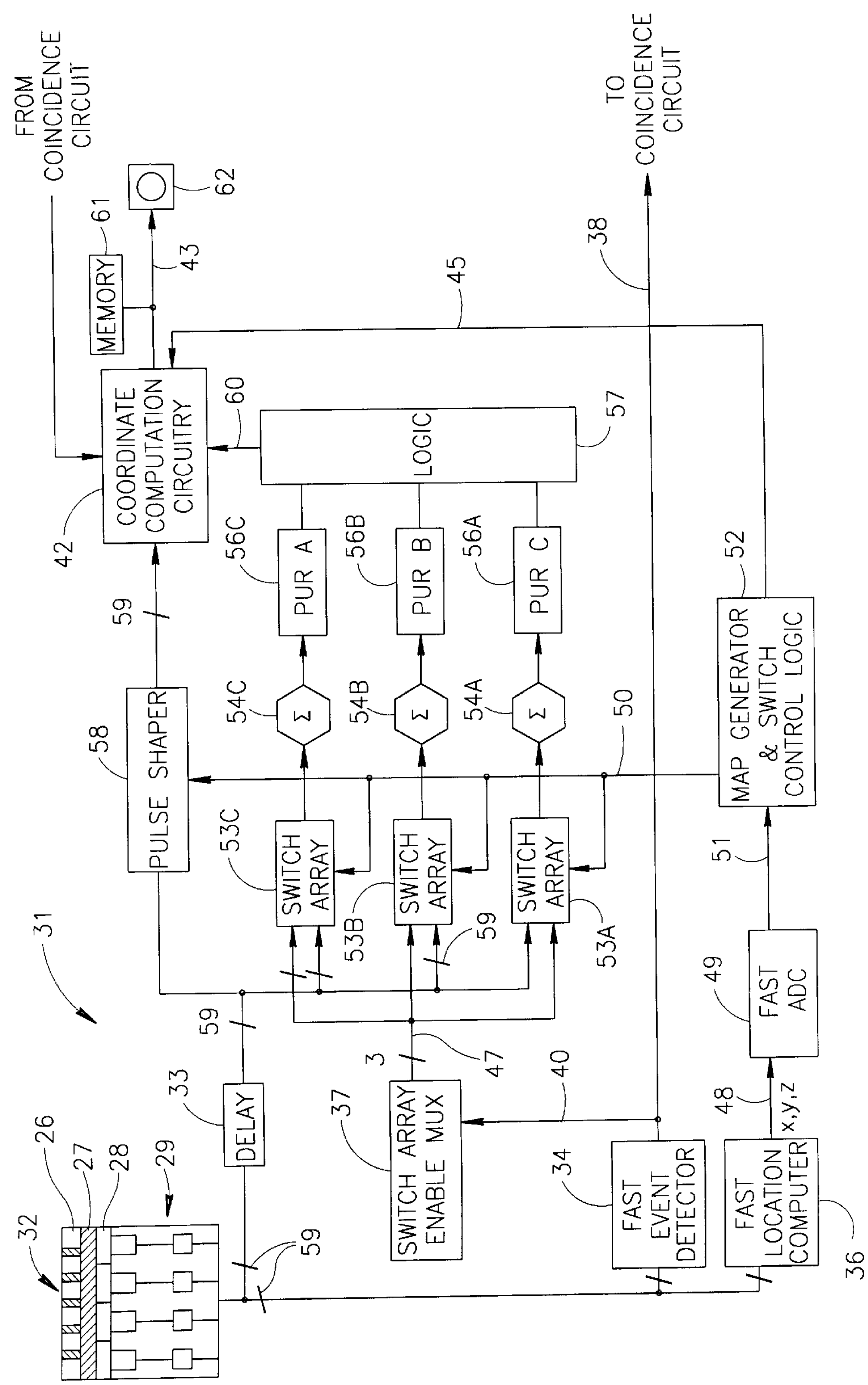
FIG. 1A is a block diagram showing an aspect of a gamma camera system, according to an embodiment of the invention.
Figure 1B:
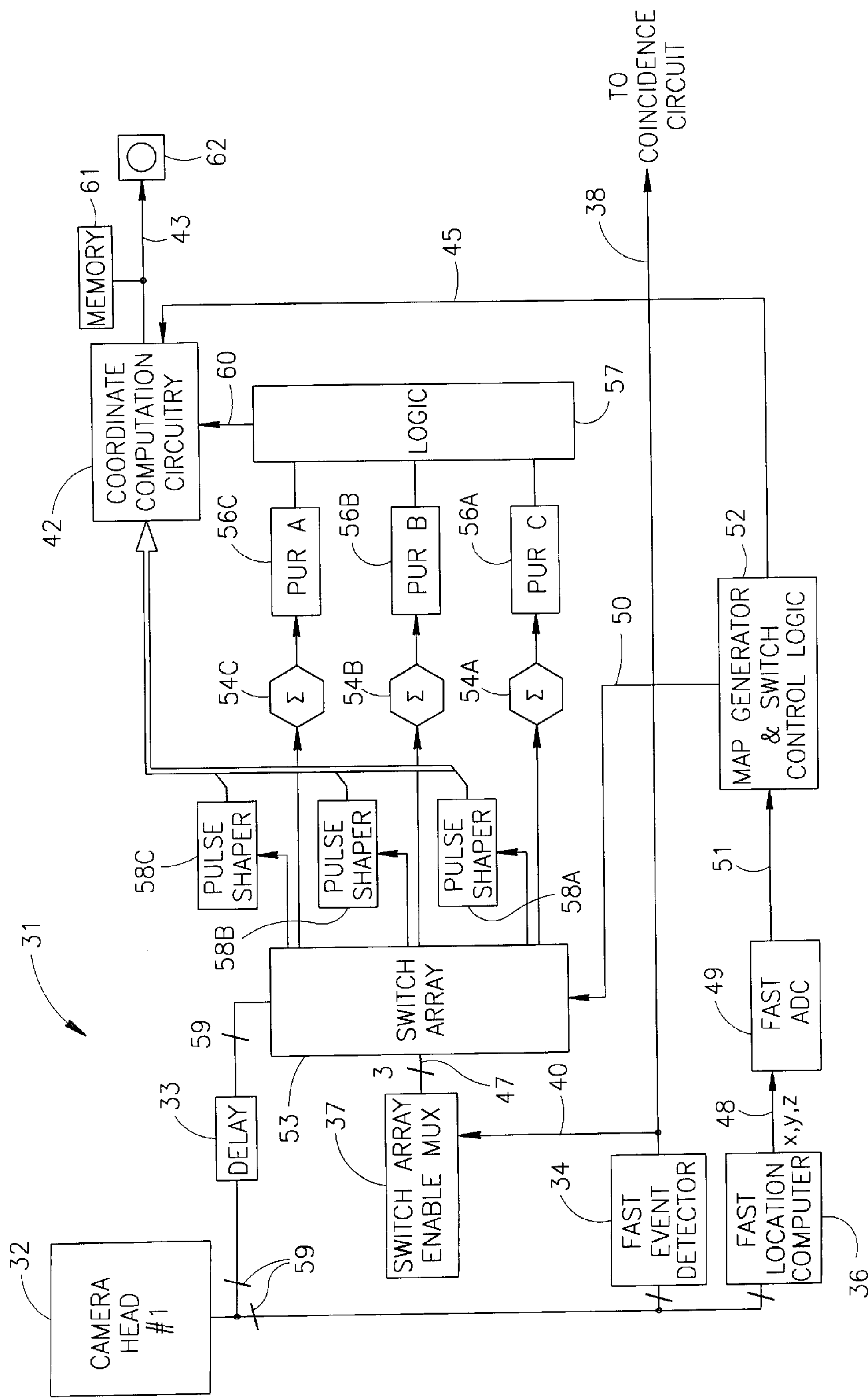
FIG. 1B is a block diagram showing another embodiment of the invention made by modifying the block diagram of FIG. 1A.
Figure 1C:
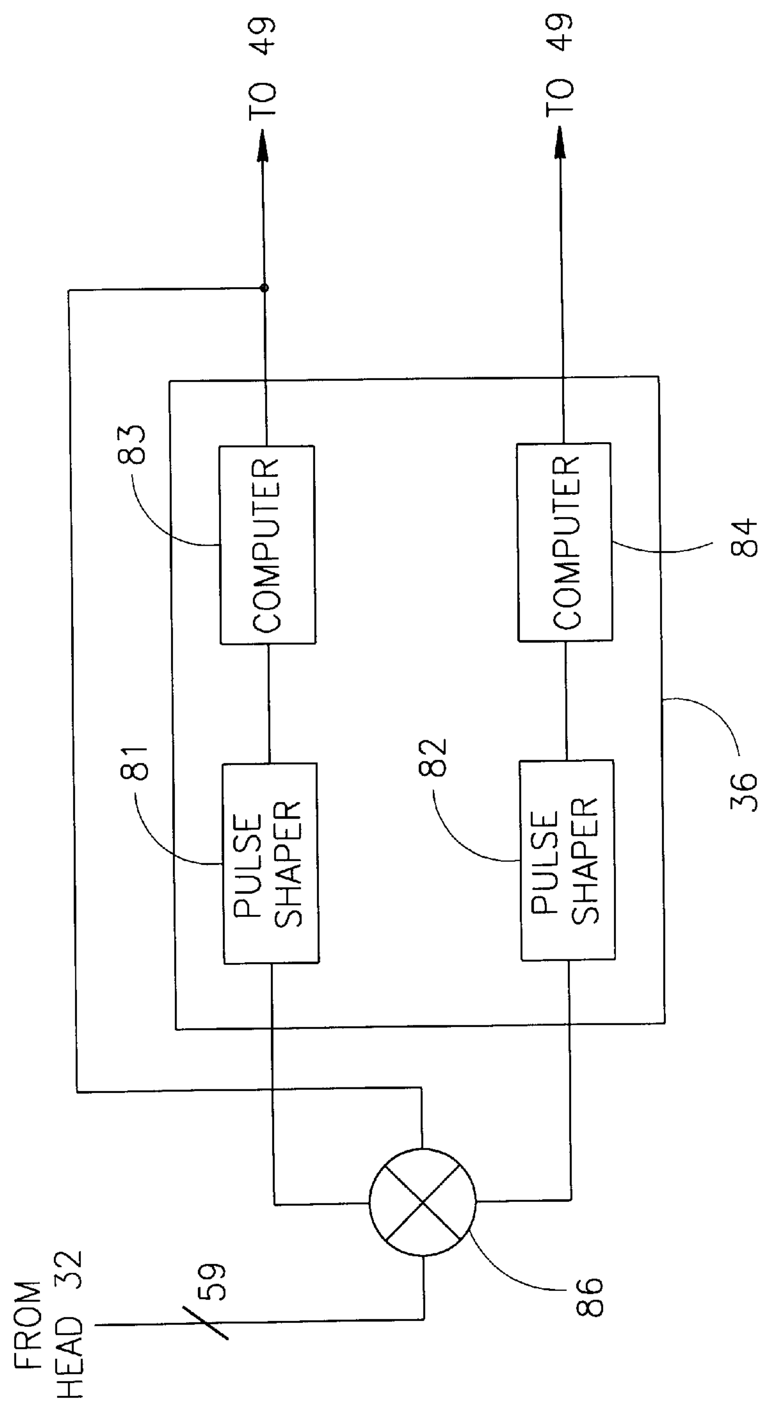
FIG. 1C is a block diagram showing details of an embodiment of a portion of the gamma camera system.
Figure 2:
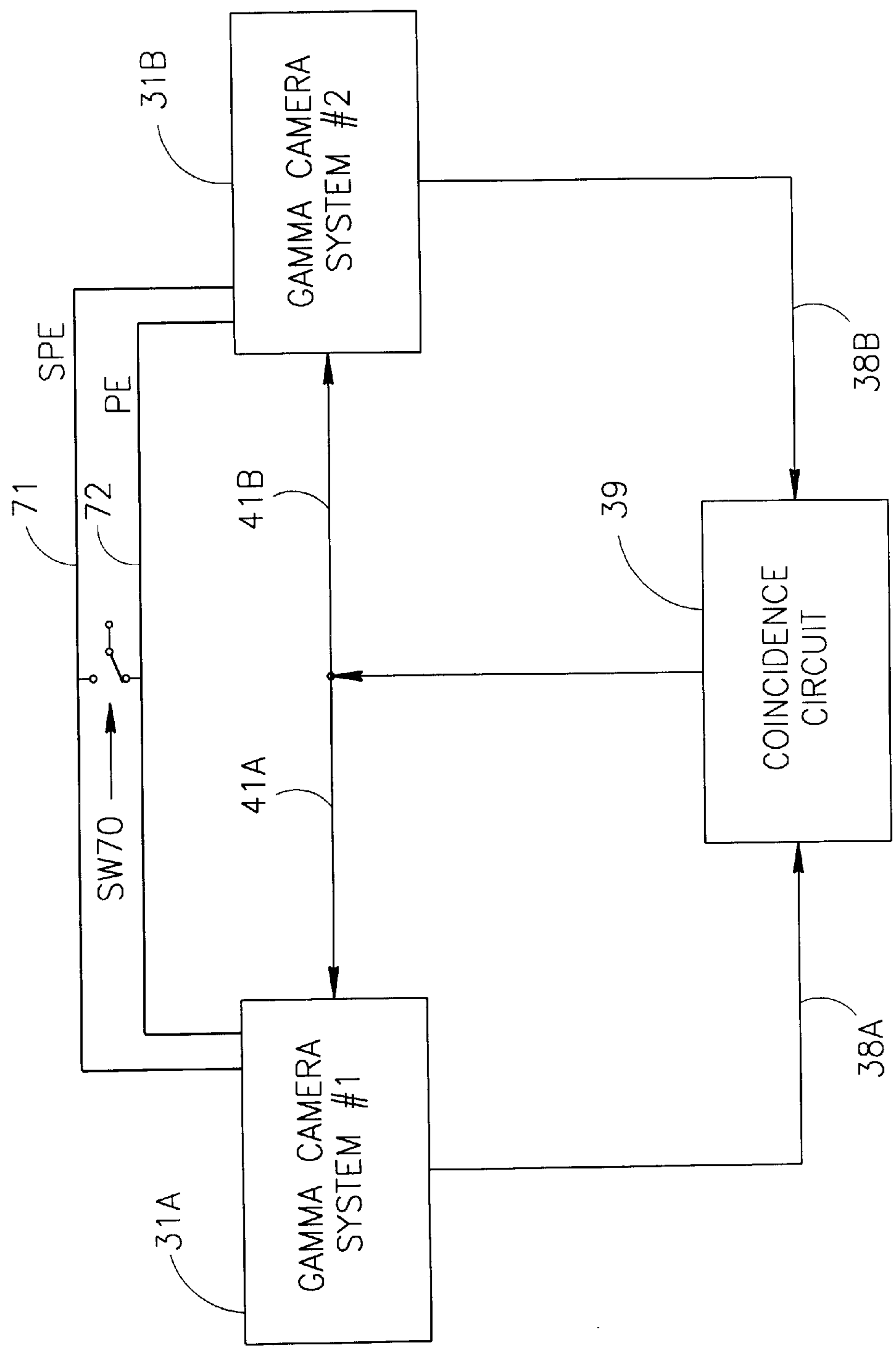
FIG. 2 is a block diagram showing two gamma camera systems incorporated into a PET system.

FIGS. 1A, 1B and 1C shown herein are designed to be used to describe and explain the operation of exemplary gamma camera systems, in accordance with embodiments of the invention, both with regard to such systems using a single head for planar imaging or for SPECT imaging or for using multiple heads for planar or SPECT imaging. FIG. 2 shows how a system with coincident circuitry is adapted for PET imaging.

An exemplary gamma camera system 31 is shown in FIG. 1A. It comprises a camera head shown at 32. The camera head 32 generally includes a collimator 26, a scintillating crystal 27 which provides scintillations (light flashes) responsive to gamma radiation impinging thereon. The camera head also includes, as is well known, a plurality of light transducers such as an array of photo-multiplier tubes 28 coupled to the scintillating crystal. Some systems do not have a collimator. Some systems use transducers other than PMTs such as solid state detectors. The light transducers convert the scintillations to electrical signals. The electrical signals provided by the light transducers are connected to preamplifier units indicated at 29, which may be an integral part of the camera head. For digital systems, the units 29 include digitizers and preamplifiers. Accordingly, the output of the head is shown as provided on a channel or a conductor from each of the PMTs. As shown herein, by way of example, the number 59 is used to indicate that there are 59 PMTs arrayed in the exemplary camera head. However, as is well-known by those skilled in the art, more or fewer than 59 PMTs can be used to convert the scintillations to electrical signals.

As shown in the exemplary embodiment, the amplified electrical signals are sent to a delay circuit 33, a fast-event detector 34 and a fast-location computer 36. Delay circuit 33 acts to delay the signal to enable fast-event detector 34 and fast-location computer 36 to operate and provide an indication of an X-Y coordinate location for the event, along with a fast-energy (Z) computation. The X-Y location and the energy computation are indicated by the x-y-z symbols on the output at 48 of the fast-location computer. While only one fast event detector 34 and fast location computer 36 per channel are shown, actually more than one fast event detector or fast location detector may be provided for each channel i.e., for each PMT, or for groups of PMTs in quadrants or other regions of the crystal. A larger number of such detectors per channel can be used to determine the presence of closely-spaced events in their regions, which may or may not overlap. Furthermore, the events may be detected per detector or the outputs may be summed such that a single event output signal is generated.

When an event is detected by fast event detector circuit 34, then a switch array enable Mux 37 is enabled over conductors 38 and 40. The output of Mux 37 indicates the number 3 by way of example to show that three switch arrays are controlled by Mux 37. Actually, fewer or more may be controlled. Mux 37 directs, over conductor 47, the operation of one or a plurality of switch arrays, such as arrays 53A, 53B and 53C to connect selected PMTs that are proximate to the detected events. If the fast-event detector 34 detects a first event and then succeeding events during what would be the prior art dead-time caused by the first (preceding) event; then, for each succeeding event detected during this dead-time, the switch array enabler Mux 37 is notified of the succeeding events over conductors 38 and 40. Responsive to such notification, a switch array is connected for each detected event. Accordingly, PMT clusters are assembled per event. Other arrangements, known in the art, may be used to selectively connect the PMTs.

In some embodiments of the invention, fast location computer 36 does a coarse computation, and determines the X and Y location coordinates, and the Z energy at that location. In an exemplary embodiment, the X and Y coordinates, and the energy Z, are transferred through a fast analog to digital converter ADC 49 and conductor 51 to a map generator and switch control logic circuit 52. Preferably, contained in the circuit 52 is a normalizer for normalizing the X and Y coordinate values with the energy value along with a look-up table. The normalized X and Y coordinates are the addresses on the look-up table which determine which of the PMTs to connect. The look-up table, of the map generator 52 provides switch array and cluster information, that is which PMTs should be connected to form a cluster to provide signals for a coordinate computer 42 to determine the location of the light event for imaging purposes. The look-up table output is transferred to the switch arrays over conductor 50. In some embodiments of the invention, the clusters are built dynamically around the event regardless of where the event occurs.

The Map Generator and Switch Logic circuit 52 may contain a threshold used to operate a gate customarily used in Anger type gamma cameras to reduce the effects of Compton scatter. Thus, the output of circuit 52 is also shown as being connected over conductor 45 to enable the coordinate computation circuit 42 and over conductor 50 to enable he switch arrays 53A, 53B, 53C and a pulse shaper 58 that may include an integrator. As shown in FIG. 1A, there is in this embodiment a pulse shaper per PMT.

When the fast event detector 34 encounters more than one event during what would be he dead-time of the system, and when the events are spatially separated so as to require monitoring by different, not overlapping PMT clusters, then more than one switch array, of the witch arrays 53A, 53B and 53C are enabled and a plurality of different PMT clusters are connected. It should be understood that fewer or more switch arrays than the three shown in FIG. 1A can be utilized within the scope of the invention.

The switch arrays individually connect clusters of PMTs as a function of the location of the event, as determined by the coarse X-Y coordinates. Accordingly, circuit 52, for example with a look-up table, instructs the appropriate switch array 53A, 53B or 53C as to which PMTs should be connected in the clusters. Thus, circuit 52 causes proper switches of switch array 53A, for example, to operate to connect delayed energy signals from delay-circuit 33 to an enabled switch array circuit. In this example, the other switch array circuits 53B and 53C are not necessarily operated at this time. The delayed energy signals obtained from the camera head are then transmitted to the summation circuits 54A, 54B or 54C, under the control of the activated switch array 53A, 53B or 53C. The summed energy signal then passes through and operates the pile-up rejector circuits (PUR) 56A, 56B or 56C. Thus, the fast location computer 36 determines the coordinate location for pile-up rejection. This is not necessarily the same coordinate location used for constructing the image which is determined by the coordinate computation circuitry 42.

The pile-up rejectors operate to reject signals only if the pile-up occurs within the time period $\tau_1$ or within the area monitored by the selected cluster i.e., within the scope of the selected cluster. However, when a plurality of signals are received, for example, during what was the dead time of the system in the prior art, but are separated spatially i.e., occur in locations monitored by different PMT clusters, then the signals that were previously rejected, are not rejected, but used because such signals are operated on by the different selected PMT clusters and associated circuitry.

The outputs of the pile-up rejector circuits when there is no pile-up i.e., validation and summed energy signals from the PUR circuitry, are sent through a logic circuit 57, and conductor 60 to the coordinate computation circuitry 42 to enable the circuit 42. The image data of circuit 42 is transferred to a memory 61 and a monitor 62 for providing the images. More particularly, the logic circuit codifies the validation signals coming from the pile-up rejection circuitry (56A, 56B, 56C), and sends the codified validation signals to the coordinate computation circuitry 42.

An integrator or pulse shaper per channel, such as unit 58, receives the delayed information from delay circuit 33 i.e., the delayed amplified signals. The pulse shaper 58 also receives an enable signal from the map generator 52 on conductor 50. If the pulse shaper 58 is in the form of integrator, it may include truncation circuitry which substantially reduces the system dead time. Alternatively, the shaping circuitry decreases the dead time. The truncation may depend on the time of the next event.

The amplified shaped signals are sent to the coordinate computation circuitry 42 which computes and normalizes the coordinates of each event. More particularly, the output of the pulse shaper provides the data required for circuit 42 to determine the coordinates of the event. That is, to perform the Anger arithmetic. The output of the pulse shaper also provides the energy used for normalization, and for the intensity at the computed coordinate location. The output 43 of the coordinate computation circuit 42 is imaging information; that is, the location and energy of the events. Memory 61 is used to provide the image on monitor 62.

It should be noted that the signal outputs of the fast location computer 36 may also be transmitted to coordinate computation circuitry 42 over conductor 48, through fast analog to digital converter (ADC) 49, conductor 51 and through circuit 52 and conductor 45. This enables the coarse location to be imaged on monitor 62.

While FIG. 1A shows three switch arrays, three summation circuits and three pile-up rejection circuits, the showing is by way of example, fewer or more such circuits could be used within the scope of the present invention.

FIG. 1B shows a variation in the embodiment of FIG. 1A wherein instead of pulse shaper 58 per PMT channel, these system components are provided per X, Y and Z channels for each switch array. This enables a saving in components.

In FIG. 1B, the output of camera head 32 is coupled to the pulse shaper circuitry shown at 58A, 58B and 58C through the switch arrays indicated at 53. Thus, the delayed signal from the camera head and delay circuit 33 is coupled through the switch arrays 53 activated by Mux 37 to three shaper circuits 58A, 58B and 58C. In some embodiments of the invention, the number of shaper circuits for each of X, Y and Z coordinate location is equal to the number of switch arrays provided. The outputs of shaper circuits are coupled to the coordinate computation circuits which may also be reduced in number to the number of switch arrays provided. Note that the switch arrays are shown as coupled directly to summation circuits 54A, 54B and 54C. In addition, the shaper circuits are shown as receiving signals from circuit 52 through switch array 53.

FIG. 1C shows yet another embodiment of FIG. 1A wherein a plurality of pulse shapers are provided per channel in the fast location circuit. In the embodiment of FIG. 1A the number of pulse shapers per channel in the fast location circuit is not specified. More particularly, in FIG. 1C, the signal from the camera head 32 is directed to the fast location computer 36 through switch arrangement 86. In the fast location computer, two pulse integrator or shaper circuits 81 and 82 at the input of the computer are shown. The first received signal is directed by switch arrangement 86 to shaper circuit 81 which is coupled to a fast computer 83. If a second signal is received before there is a signal at the output of the fast location computer 83; then, the newly arrived signal is directed to the shaper circuit 82 and computer 84 through switch arrangement 86. This use of dual-pulse shapers at the input of the fast location computer further decreases pile-up problems.

FIG. 2 shows a plurality of gamma camera systems 31A and 31B, used for PET applications. In accordance with an exemplary embodiment of the invention for PET applications, two gamma camera heads and associated circuitry are provided. The associated circuitry includes switching arrangements for detecting events of PET systems or SPE systems, including SPECT systems. PET applications require a coincidence of events in oppositely-disposed gamma camera heads. Accordingly, the output of the fast-event detector such as fast event detector 34 of each gamma camera system 31A and 31B is sent to a coincidence circuit 39 over conductors 38A and 38B, for the PET application. Thus, as shown, switch 70 is operated either to activate line 71 for SPECT operation or to activate line 72 for PET operation.

In the described embodiment, when the two fast-event detectors respond to events occurring in different heads at substantially the same time, a coincidence of events is indicated in coincidence circuit 39. Responsive to the coincidence of events, a coincidence signal is sent over conductors 41A and 41B to the coordinate computation circuits 42 of each of the gamma camera systems 31A and 31B. In the coincidence mode, the signals on conductors 41A and 41B enable coordinate computation circuitry. In the coincidence mode, if there is no coincidence, there is no operation of either gamma camera system, for example there is no computation of X-Y coordinates at this point, and there is no output on output conductor 43 (FIG. 1A). The output on conductor 43 is used for providing an image. The signals from each of the camera heads are applied to the fast-event detectors of each of the gamma camera systems 31A and 31B. The output of the fast-event detector 34 is connected to the coincidence circuit 39, over conductors 38A and 38B.

Generally, when the system is in the coincidence mode, a coincidence determination from coincidence circuit 39 is required to enable the coordinate computation circuit 42. In other respects the system operates as described with regard to increasing the count rate and nonetheless reducing pile-up problems. Each detector head in the coincidence mode includes the circuitry of the system 31 whereby what formerly were pile-up events are used by the system if the events are located in detector areas monitored by different PMT clusters and where the succeeding event occurs at least $\tau_1$ ns after the preceding event in the same detector.

The foregoing description of specific embodiments of the present invention has been presented for purposes of illustration and description. The description is not intended to be exhaustive or to limit the invention to the precise forms disclosed. Obviously many modifications and variations are possible in the light of the above teaching. Thus, some embodiments of the invention may not include all of the elements of the disclosed embodiments. In addition, some of the structures described herein for performing certain functions may be replaced by other structures that perform the same or similar functions. The embodiments were chosen in order to explain the principles of the invention and the practical applications thereof to thereby enable other skilled in the art to best utilize the invention and various embodiments with various modifications as suited for the particular use contemplated. It is intended that the scope of the invention be defined by the claims appended hereto and their equivalents.

The terms "comprise", "include" or "have" or their conjugates as used herein mean "including but not limited to".

What is claimed is:

1. A gamma camera system including:

a gamma radiation detector comprising light sensors operative to detect a location of events responsive to gamma radiation impinging on the detector;

a light sensor selector that selects light sensors adjacent to the location of the events to form a selected cluster of sensors to monitor the detected events during a light collection time; and wherein said system validates preceding and succeeding events when the succeeding events are outside the area monitored by the selected cluster.

2. The gamma camera system of claim 1 and analog to digital circuitry to partially digitize said system.

3. The gamma camera system of claim 1 and analog to digital circuitry to digitize said system.

4. The gamma camera system of claim 1 wherein said light sensors provide signals responsive to said events.

5. The gamma camera system of claim 4 wherein said signals are analog signals.

6. The gamma camera system of claim 4 wherein said signals are digital signals.

7. The gamma camera system of claim 1 wherein said sensors are PMTs.

8. The gamma camera system of claim 1 including:

pile-up rejector circuitry (PUR) for rejecting as pile-up events, succeeding events which occur while preceding events are being processed and wherein said succeeding events are within an area monitored by the selected cluster.

9. The gamma camera system of claim 1 wherein the system uses preceding events and succeeding events when the succeeding events are in the area of a different selected cluster and are separated time-wise so that the events do not contaminate one another.

10. The gamma camera system of claim 9 wherein the time-wise separation is approximately 50 ns.

11. The gamma camera system of claim 4 including:

location circuitry that processes said signals to determine coarse coordinates of the detected events.

12. The gamma camera system of claim 11 wherein said location circuitry includes at least one fast event detector and at least one fast location computer for approximating the coordinates of said detected events.

13. The gamma camera system of claim 12 wherein said location circuitry further includes coordinate computation circuitry for determining the location of the events for imaging purposes.

14. The system of claim 12 wherein the light sensor selector includes:

a switch air Mux operated responsive to said fast event detector for selecting a plurality of switch arrays to select light sensor to form said selected cluster.

15. The gamma camera system of claim 14 including:

a delay circuit for delaying said signals from the light sensors to provide delayed signals.

16. The gamma camera system of claim 15 wherein said light sensor selector further includes a fast-location computer to compute the coarse location of the detected event and switch control logic circuitry for selecting the switch arrays to connect the light sensors closest to the detected event for providing said selected cluster to monitor the event.

17. The gamma camera system of claim 16 including:

summation circuits connected to said selected light sensors through said switch array to sum the signals to provide total energy signals; and coordinate computation circuitry for providing coordinates of the detected event responsive to said delayed signals.

18. The gamma camera system of claim 16 including:

shaping circuitry for shaping the delayed signals before the transmittal of the delayed signal to the coordinate computation circuitry; and logic circuitry for connecting validation signals to the image coordinate computation circuitry to enable said image coordinate computation circuitry.

19. The gamma camera system of claim 17 wherein said logic circuit includes:

a threshold enable circuit for enabling the coordinate computation circuitry when the detected signal is greater than a certain threshold.

20. The circuitry of claim 18 wherein said shaping circuitry includes integrating circuitry.

21. The system of claim 20 wherein the integrating circuitry comprises a plurality of integrators for each PMT.

22. The gamma camera system of claim 21 wherein said gamma camera system includes:

at least a pair of gamma camera heads and coincidence circuitry for determining when there is a coincident event at each of said gamma camera heads.

23. The gamma camera system of claim 22 including:

at least one analog to digital converter for converting the detected analog signals to digital signals.

24. A high count rate method for a gamma camera system including a gamma radiation detector comprising a scintillation crystal, and a plurality of light detectors for converting scintillations to signals; the method including:

detecting events responsive to gamma radiation impinging on said detector;

processing said detected events to approximate energy and coordinates of the detected events;

monitoring the detected events from locations adjacent to the events; and accepting preceding and succeeding events, when the succeeding events occur within a dead time caused by the preceding event but are outside the area monitored from location adjacent to the events.

25. The high count rate method of claim 24 including providing signals responsive to said events.

26. The high count rate method of claim 25 wherein said signals are analog signals.

27. The high count rate method of claim 26 and converting said analog signals to digital signals.

28. The high count rate method of claim 25 including accepting preceding events and succeeding events when the succeeding events are in the area different than the area adjacent to the event.

29. The high count rate method of claim 28 wherein the time-wise separation is approximately 50 ns.

30. The high count rate method of claim 25 including approximating the coordinates of said detected events.

31. The high count rate method of claim 30 and determining the location of the events with greater accuracy.

32. The high count rate method of claim 30 including:

delaying said signals.

33. The high count rate method of claim 30 including computing fine coordinates of the detected event responsive to said delayed signals.

34. The high count rate method of claim 33 including:

shaping the delayed signal before computing the fine coordinates of the detected event; and connecting total energy signals to normalize the fine coordinates.

35. The high count rate method of claim 34 including:

enabling accurate computation of the coordinates when the energy of the events is greater than a certain threshold.

36. The high count rate method of claim 34 including shaping said detected signals.

37. The high count rate method of claim 36 wherein said shaping includes integrating.

38. The high count rate method of claim 36 including:

converting the detected analog signals to digital signals.

39. The high count rate method of claim 24 including:

providing the number of coordinate computation circuits equal to the number of switch arrays.

40. The high count rate method of claim 24 including:

using a number of coordinate computation circuits approximating the number of light detectors.

41. The high count rate method of claim 24 including using a number of pulse shapers approximating the number of light detectors.

42. The high count rate method of claim 24 including limiting the number of pulse shapers to no more than the number of switch arrays.

43. A high count rate gamma camera method using a gamma camera including:

determining the locations of preceding and succeeding events;

selecting a cluster of PMTs; and using the preceding and succeeding events that occur within a time interval proportional to the light collection time of the camera but are spatially separated, wherein said system validates preceding and succeeding events when the succeeding events are outside the area monitored by the selected cluster.

44. The high count rate method of claim 43 including partially digitizing the gamma camera.

45. The high count rate method of claim 43 including digitizing the gamma camera.

46. A gamma camera system comprising:

a gamma camera radiation detector comprising:

a scintillator;

a plurality of photodetectors that view the crystal and generate time varying signals responsive to radiation that impinges on the scintillator;

an approximate position detector that determines an approximate position of a radiation event responsive to the time varying signals;

a location computer, having a plurality of inputs, that computes a location of the event based on time varying input signals input thereto; and switching circuitry that controlled by approximate position detector switches time varying signals from selected ones of said radiation detector to said inputs, responsive to the determined approximate position.

47. A system according to claim 46 wherein the switching circuitry comprises a plurality of switch arrays which switch different combinations of said time varying signals from said photodetectors to said location circuitry, for different events.

48. A system according to claim 46 wherein the location computer comprises at least one integration that integrates the input signals.

49. A system according to claim 46 and including integrators that integrate said time varying signals after they have been switched.

50. A method of utilizing a gamma camera having a scintillator, a plurality of detectors that view the scintillator and produce analog signals responsive to radiation events that cause scintillations in the scintillator, comprising:

determining the approximate position of an event responsive to the signals;

switching selected ones of the analog signals, responsive to the determined approximate position; and determining the position of the event responsive to the switched analog signals.

51. A method according to claim 50 and including delaying the signals prior to said switching while coarsely determining the position.

52. A method according to claim 50 and including integrating said signals after said position is coarsely located.

* * * * *